(12) United States Patent
Shishido et al.

(10) Patent No.: US 9,005,796 B2
(45) Date of Patent: Apr. 14, 2015

(54) POWER STORAGE UNIT HAVING REINFORCING MEMBERS IN A DIRECTION CROSSING THE TRANSVERSE DIRECTION

(75) Inventors: Tomohiko Shishido, Nisshin (JP); Yoshinori Noritake, Toyota (JP); Kiyoshi Matsumoto, Owariasahi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 699 days.

(21) Appl. No.: 12/513,445

(22) PCT Filed: Nov. 7, 2007

(86) PCT No.: PCT/JP2007/072061
§ 371 (c)(1),
(2), (4) Date: May 4, 2009

(87) PCT Pub. No.: WO2008/059853
PCT Pub. Date: May 22, 2008

(65) Prior Publication Data
US 2010/0119931 A1    May 13, 2010

(30) Foreign Application Priority Data
Nov. 13, 2006   (JP) ................... 2006-306608

(51) Int. Cl.
*H01M 2/00* (2006.01)
*B60R 16/04* (2006.01)
*H01M 2/10* (2006.01)
(Continued)

(52) U.S. Cl.
CPC ..... *H01M 2/1072* (2013.01); *B60K 2001/0427* (2013.01); *H01M 2/1083* (2013.01); *H01M 10/12* (2013.01); *Y02E 60/126* (2013.01); *Y02T 10/7016* (2013.01); *Y02T 90/34* (2013.01)

(58) Field of Classification Search
CPC ................. B60K 2001/0427; H01M 2/1083
USPC .......... 180/65.5; 248/503; 224/902; 429/153, 429/163, 120
See application file for complete search history.

(56) References Cited

U.S. PATENT DOCUMENTS

| | | |
|---|---|---|
| 5,704,644 A | 1/1998 | Jaggi |
| 6,264,260 B1 | 7/2001 | Kronner et al. |
| 6,333,091 B1 * | 12/2001 | Kasugai et al. ............... 428/131 |

(Continued)

FOREIGN PATENT DOCUMENTS

| | | |
|---|---|---|
| DE | 1052489 B | 3/1959 |
| DE | 1671683 A1 | 9/1971 |

(Continued)

OTHER PUBLICATIONS

English-language translation of German Patent Office Action dated Oct. 30, 2012 for DE 11-2007-002525.5.

*Primary Examiner* — Maria J Laios
(74) *Attorney, Agent, or Firm* — Sughrue Mion, PLLC

(57) ABSTRACT

A power storage unit includes a battery module housed in a battery case. The battery module has, as components, a plurality of battery cells stacked and arranged in a direction (direction Y) crossing a transverse direction. Reinforcing members arranged at a predetermined spacing are provided between the battery cells. The power storage unit of this structure can prevent damage to the power storage unit disposed between seats adjacent to each other in the transverse direction, when frame members provided in the seats are moved in the transverse direction in the event of a crash of a moving conveyance.

6 Claims, 5 Drawing Sheets

(51) Int. Cl.
*H01M 10/12* (2006.01)
*B60K 1/04* (2006.01)

(56) References Cited

U.S. PATENT DOCUMENTS

| | | | |
|---|---|---|---|
| 6,547,020 B2 * | 4/2003 | Maus et al. | 180/68.5 |
| 6,662,891 B2 | 12/2003 | Misu et al. | |
| 6,811,197 B1 | 11/2004 | Grabowski et al. | |
| 6,902,020 B2 | 6/2005 | Kronner et al. | |
| 6,978,855 B2 | 12/2005 | Kubota et al. | |
| 7,048,321 B2 | 5/2006 | Bandoh et al. | |
| 7,240,752 B2 | 7/2007 | Takahashi et al. | |
| 7,270,202 B2 | 9/2007 | Kondo | |
| 7,353,900 B2 | 4/2008 | Abe et al. | |
| 7,424,926 B2 | 9/2008 | Tsuchiya | |
| 7,556,110 B2 | 7/2009 | Yamamoto et al. | |
| 7,631,712 B2 | 12/2009 | Watanabe | |
| 7,654,351 B2 | 2/2010 | Koike et al. | |
| 7,810,596 B2 | 10/2010 | Tsuchiya | |
| 7,819,215 B2 | 10/2010 | Tsuchiya | |
| 7,900,728 B2 | 3/2011 | Suzuki et al. | |
| 7,913,787 B2 | 3/2011 | Watanabe et al. | |
| 8,016,062 B2 | 9/2011 | Jufuku | |
| 8,042,637 B2 | 10/2011 | Nagata et al. | |
| 8,051,934 B2 | 11/2011 | Kiya et al. | |
| 2004/0016580 A1 | 1/2004 | Kronner et al. | |
| 2004/0232672 A1 | 11/2004 | Bandoh et al. | |
| 2004/0235315 A1 | 11/2004 | Masui et al. | |
| 2005/0208375 A1 | 9/2005 | Sakurai | |
| 2006/0240318 A1 * | 10/2006 | Kim et al. | 429/153 |
| 2007/0007054 A1 | 1/2007 | Nakashima et al. | |
| 2007/0026305 A1 * | 2/2007 | Jeon et al. | 429/159 |
| 2008/0318119 A1 | 12/2008 | Watanabe et al. | |
| 2009/0183935 A1 | 7/2009 | Tsuchiya | |

FOREIGN PATENT DOCUMENTS

| | | |
|---|---|---|
| EP | 0817287 A1 | 1/1998 |
| EP | 1865567 A1 | 12/2007 |
| JP | 06-029041 A | 2/1994 |
| JP | 09-199094 A | 7/1997 |
| JP | 2003327155 A | 11/2003 |
| JP | 2004-090693 A | 3/2004 |
| JP | 2004-345447 A | 12/2004 |
| JP | 2004345454 A | 12/2004 |
| JP | 2005001655 A | 1/2005 |
| JP | 2005-116430 A | 4/2005 |
| JP | 2005-268004 A | 9/2005 |
| JP | 2006236826 A | 9/2006 |
| JP | 2006-278201 A | 10/2006 |
| JP | 2007015588 A | 1/2007 |

* cited by examiner

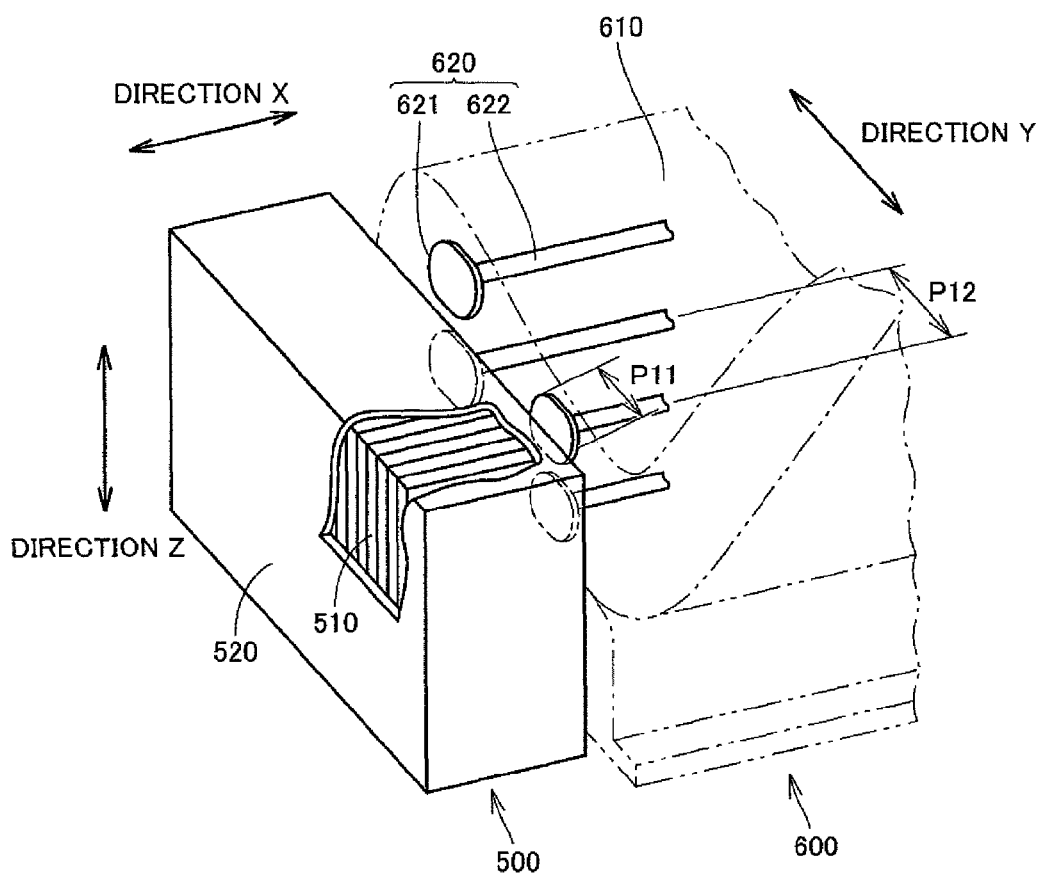

POWER STORAGE UNIT HAVING REINFORCING MEMBERS IN A DIRECTION CROSSING THE TRANSVERSE DIRECTION

TECHNICAL FIELD

The present invention relates to a power storage unit, and more particularly to improvements in structure of a power storage unit.

BACKGROUND ART

In recent years, as typical examples of moving conveyances, electric vehicles using electric motors as driving sources as well as so-called hybrid cars having multiple kinds of driving sources such as electric motors and gasoline engines have been put to practical use. These electric vehicles and the like are equipped with a power storage unit such as batteries or capacitors for power storage for supplying electricity as energy to the electric motors or the like. For example, secondary batteries that can be repeatedly charged and discharged, such as nickel-cadmium batteries (Ni—Cd batteries), nickel-hydride batteries or lithium-ion batteries, are used as batteries.

In the case where secondary batteries are used as power storages, mounted on a vehicle is a power storage unit including a battery module having a plurality of stacked battery cells, and the battery module is housed in a battery case. The battery case, as well as the battery module and other internal components housed in the battery case are collectively referred to as a power storage unit.

FIG. 7 is a schematic view of a state in which a power storage unit 500 according to the background art implemented with secondary batteries is mounted on a vehicle. A console box (not shown) is disposed between a driver's seat (a seat 600 in FIG. 7) and a front passenger's seat (not shown) adjacent to each other in a transverse direction (direction X). Power storage unit 500 is housed in this console box. A battery module 510 in power storage unit 500 has a plurality of battery cells stacked in the direction (direction Y: a traveling direction of a moving conveyance) crossing the transverse direction.

In the vehicle shown in FIG. 7, a plurality of seat rods 620 serving as frame members extending in the transverse direction are provided in a seat section 610 of seat 600. These seat rods 620 each include a rod 622 extending in the transverse direction and an end plate 621 arranged on the both sides of rod 622. These seat rods 620 are provided to prevent seat 600 from being crushed in the event of a side crash of the vehicle. The same applies to the front passenger's seat not shown.

Japanese Patent Laying-Open No. 2004-90693 discloses a vehicle equipped with a power storage unit between the driver's seat and the front passenger's seat. Japanese Patent Laying-Open Nos. 09-199094 and 06-029041, for example, each disclose a structure of a power storage unit.

In the vehicle having the above-described structure, since seat 600 has a plurality of seat rods 620 arranged at a predetermined pitch (P12) as described above, the seat will not be crushed in the event of a side crash of the vehicle, which ensures passenger safety. However, in the event of a crash, seat rods 620 will be pushed and moved sideways as they are. Seat rods 620 abut against power storage unit 500 disposed at the side of seat 600, which may cause damage to power storage unit 500.

It should be noted that a problem similar to the foregoing will arise not only in a vehicle, but also in a moving conveyance with a power storage unit arranged and structured similarly.

DISCLOSURE OF THE INVENTION

The problem to be solved by the present invention lies in that, in a moving conveyance having a power storage unit, the power storage unit may be damaged by the movement of frame members provided in the seats in the event of a crash of the moving conveyance. It is therefore an object of the present invention to provide the power storage unit having a structure capable of preventing damage to the power storage unit disposed between seats adjacent to each other in the transverse direction even when the frame members provided in the seats are moved in the event of a crash of the moving conveyance.

A power storage unit according to the present invention is directed to a power storage unit disposed between seats adjacent to each other in a transverse direction of a moving conveyance, and including a battery case and a battery module housed in the battery case. The battery module has reinforcing members of a strength higher than the strength of components of the battery module. The reinforcing members are arranged at a predetermined spacing in a direction crossing the transverse direction.

With the power storage unit according to the present invention, the battery module includes the reinforcing members having a strength higher than the strength of the components of the battery module arranged at a predetermined spacing in the direction crossing the transverse direction. Thus, even when the frame members provided in the seats are moved in the event of a crash of the moving conveyance, the reinforcing members can abut against the frame members.

Accordingly, configuring the battery case of the power storage device to abut against the reinforcing members can prevent further deformation of the battery case toward the battery cells, even when the battery case unit is deformed inwardly due to the abutment of the frame members. This in result can prevent damage to the power storage unit that may be caused by the frame members, more specifically, damage to the battery module that may be caused by the frame members.

BRIEF DESCRIPTION OF THE DRAWINGS

FIG. 7 is a schematic view of a state in which a power storage unit according to the background art implemented with secondary batteries is mounted on a vehicle.

BEST MODES FOR CARRYING OUT THE INVENTION

Figure 1:
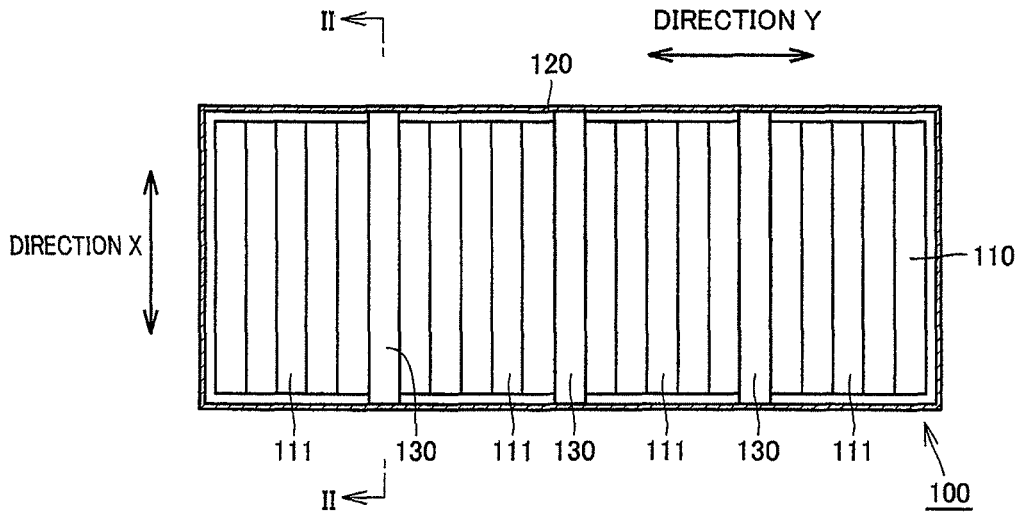
FIG. 1 is a schematic sectional view of an internal structure of a power storage unit according to an embodiment of the present invention.

In the following, a power storage unit according to an embodiment of the present invention will be described with reference to the drawings. Like reference characters denote like or corresponding parts throughout the above description of the background art and the embodiment hereinbelow, and the same description will not be repeated.

First, referring to FIGS. 1 to 3, a power storage unit according to the present embodiment will be described.

Figure 2:
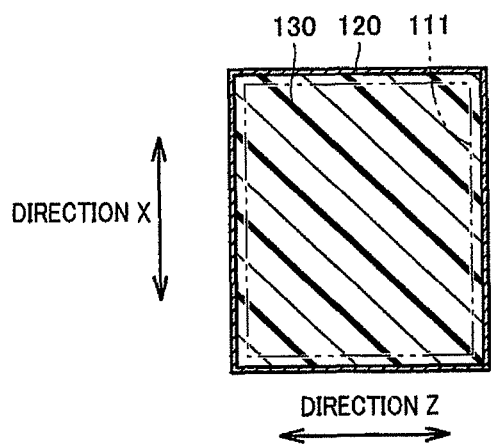
FIG. 2 is a sectional view taken along the line II-II in FIG. 1.

Referring to FIGS. 1 and 2, a power storage unit 100 according to the present embodiment is contemplated to be housed in a console box disposed between the driver's seat (see FIG. 7) and the front passenger's seat adjacent to each other in the transverse direction (direction X) of a vehicle, which is a moving conveyance, as described in the background art. Power storage unit 100 includes a battery module 110 housed in a battery case 120.

This battery module 110 has, as components, a plurality of battery cells 111 stacked and arranged in a direction (direction Y: a traveling direction of the vehicle which is a moving conveyance) crossing the transverse direction. Provided between battery cells 111 are reinforcing members 130 arranged at a predetermined spacing. These reinforcing members 130 are formed larger than the external shape of battery cells 111 as shown in FIG. 2, and made of a material having a higher strength than battery cells 111. Specifically, reinforced resin or the like including glass fibers is employed.

Figure 3:
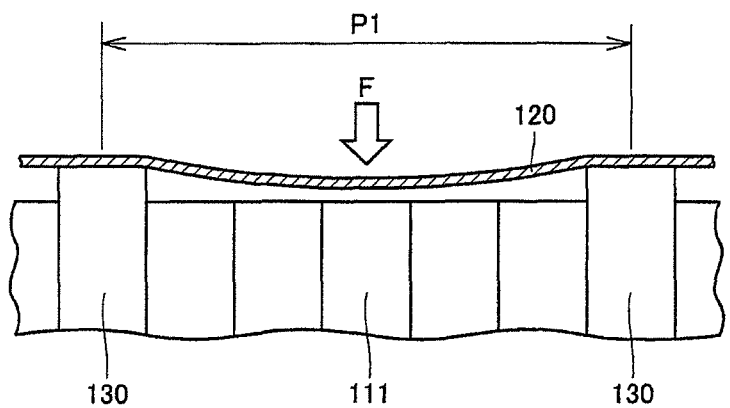
FIG. 3 is a schematic view of a battery case of the power storage unit according to the embodiment of the present invention, when the battery case is deformed inwardly.

FIG. 3 now schematically shows a state in which an external force F is externally applied to power storage unit 100. External force F includes abutment of frame members provided in the seats against power storage unit 100 that may be caused by the movement of the frame members in the event of a side crash of the vehicle. Even when external force F is externally applied to power storage unit 100 as shown in FIG. 3, a battery case 120 is bent toward battery cells 111 while making contact with abutments against reinforcing members 130 arranged at a pitch P1, which allows absorption of external force F.

In this manner, causing battery case 120 to abut against the reinforcing members can prevent further deformation of battery case 120 toward battery cells 111. This in result can prevent damage to power storage unit 100 that may be caused by the movement of the frame members, more specifically, damage to battery cells 111 that may be caused by the frame members.

Each of seat rods 620 serving as the frame members is usually formed by rod 622 and end plate 621, as shown in FIG. 7. Accordingly, arranging reinforcing members 130 at pitch P1 smaller than a length P11 (see FIG. 7) of plate 621 in the direction (direction Y) crossing the transverse direction (direction X) allows plate 621 to abut against reinforcing members 130 when seat rods 620 are moved. This in result can prevent deformation of battery case 120 toward battery cells 111. The shape of end plate 621 is not limited to an oval as illustrated, but may be of other various shapes such as a circle or polygon.

In addition, when each of seat rods 620 serving as the frame members is formed by rod 622 and end plate 621 as described above, reinforcing members 130 are not necessarily be formed larger than the contour of battery cells 111 as shown in FIG. 2. Reinforcing members 130 of the same external dimensions as the contour of battery cells 111 can also receive force at the abutments between plate 621 and reinforcing members 130.

Battery Module 210

Figure 4:
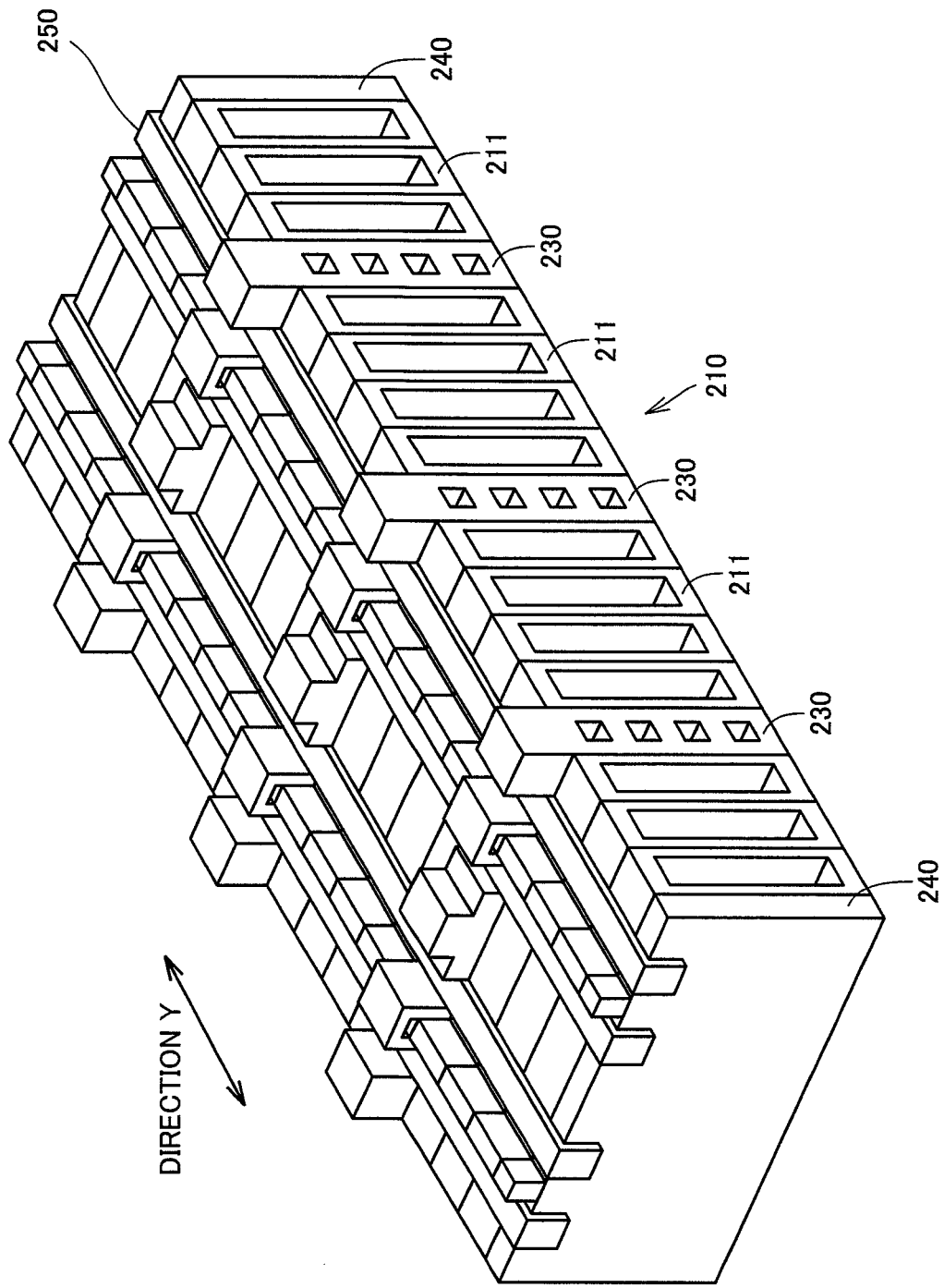
FIG. 4 is a perspective view of an exemplary specific structure of a battery module for use in the power storage unit according to the embodiment of the present invention.

As an example of a specific structure of the above-described battery module 110, a battery module 210 with a plurality of battery packs housed therein will now be described referring to FIGS. 4 and 5. A plurality of battery frames 211 holding the battery packs from their both sides are stacked and arranged in the direction Y, and the battery packs are interposed between the respective battery frames 211. In appearance, battery frame 211 constitutes a battery cell. Stacking rectangular battery cells, each having therein a battery pack sealed with resin, also presents a similar appearance to the structure shown in FIG. 4.

This battery module 210 includes a plurality of reinforcing frames 230, arranged at a predetermined pitch, serving as reinforcing members that present similar appearance and shape to those of battery frames 211. Battery frames 211 and reinforcing frames 230 are maintained in the stacked state by end plates 240 disposed on the both ends and a plurality of holding bands 250.

Figure 5:
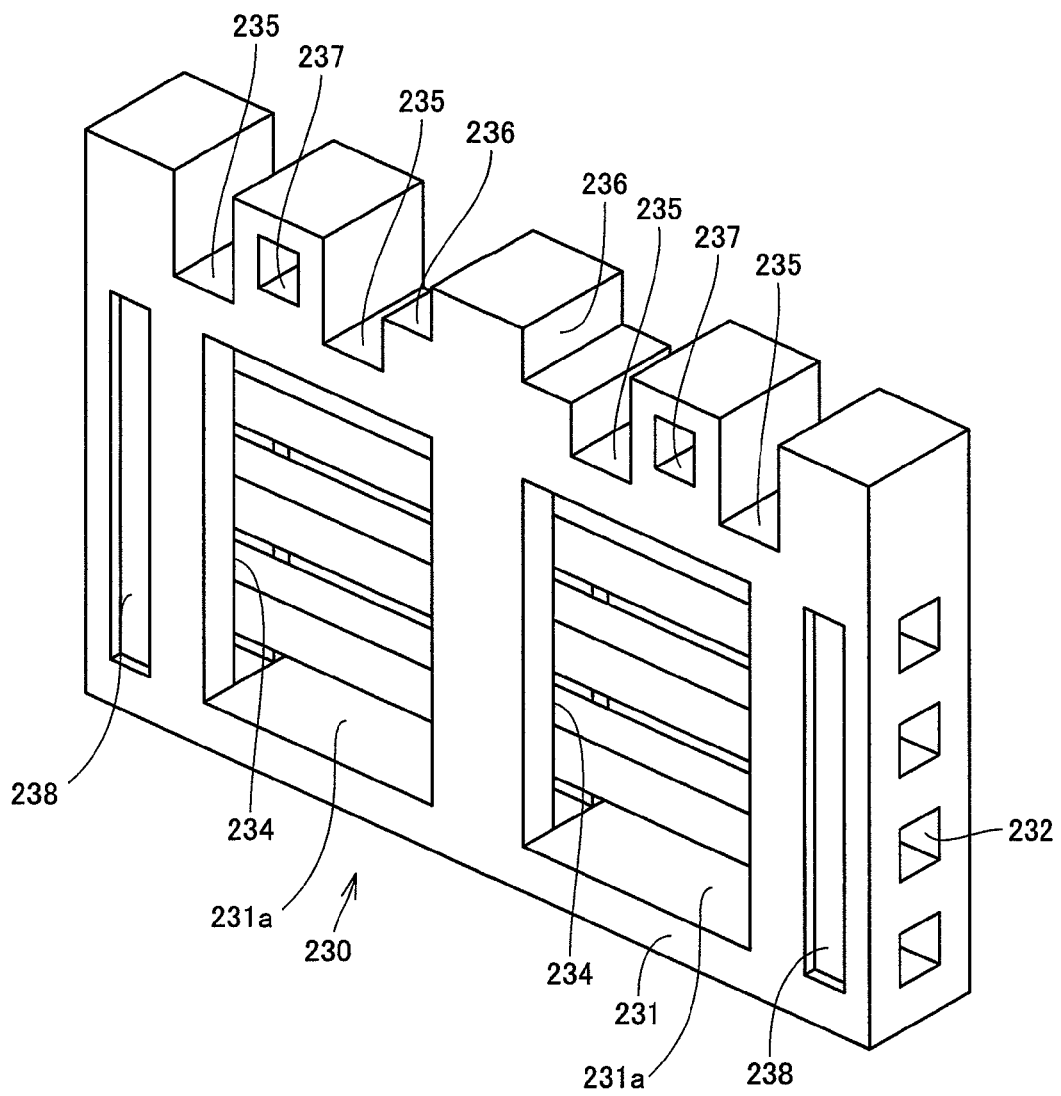
FIG. 5 is a perspective view of an external appearance of reinforcing frames according to the embodiment of the present invention.

FIG. 5 is a perspective view of the appearance of the above-mentioned reinforcing frames 230. These reinforcing frames 230 are made of resin having a higher strength than battery frames 211, and for example, reinforced resin including glass reinforced fibers is employed.

Each of reinforcing frames 230 has a body frame 231 and rectangular cavities 231a for enclosing the battery packs at two positions on each side face. In addition, coolant ports 232 are provided on end faces for dissipating heat from the battery packs, and air passages 234 communicating with coolant ports 232 are provided in cavities 231a on the both side faces.

Formed on the upper face of reinforcing frame 230 are indented grooves 235 in which holding bands 250 extend, openings 237 for gas emission, wiring guide grooves 236 for voltage detection wires for thermistors, and the like. Formed on the side face of reinforcing frame 230 are recessed regions 238 for preventing sink and warpage that may occur during resin molding as well as for keeping the molding dimensional accuracy of reinforcing frame 230.

In battery module 210 of the above-described structure, reinforcing frames 230 serve as battery frames 211, and can prevent damage to the battery cells that may be caused by the movement of the frame members in the seats in the event of a side crash of the vehicle, similarly to the aforementioned reinforcing members 130.

Figure 6:
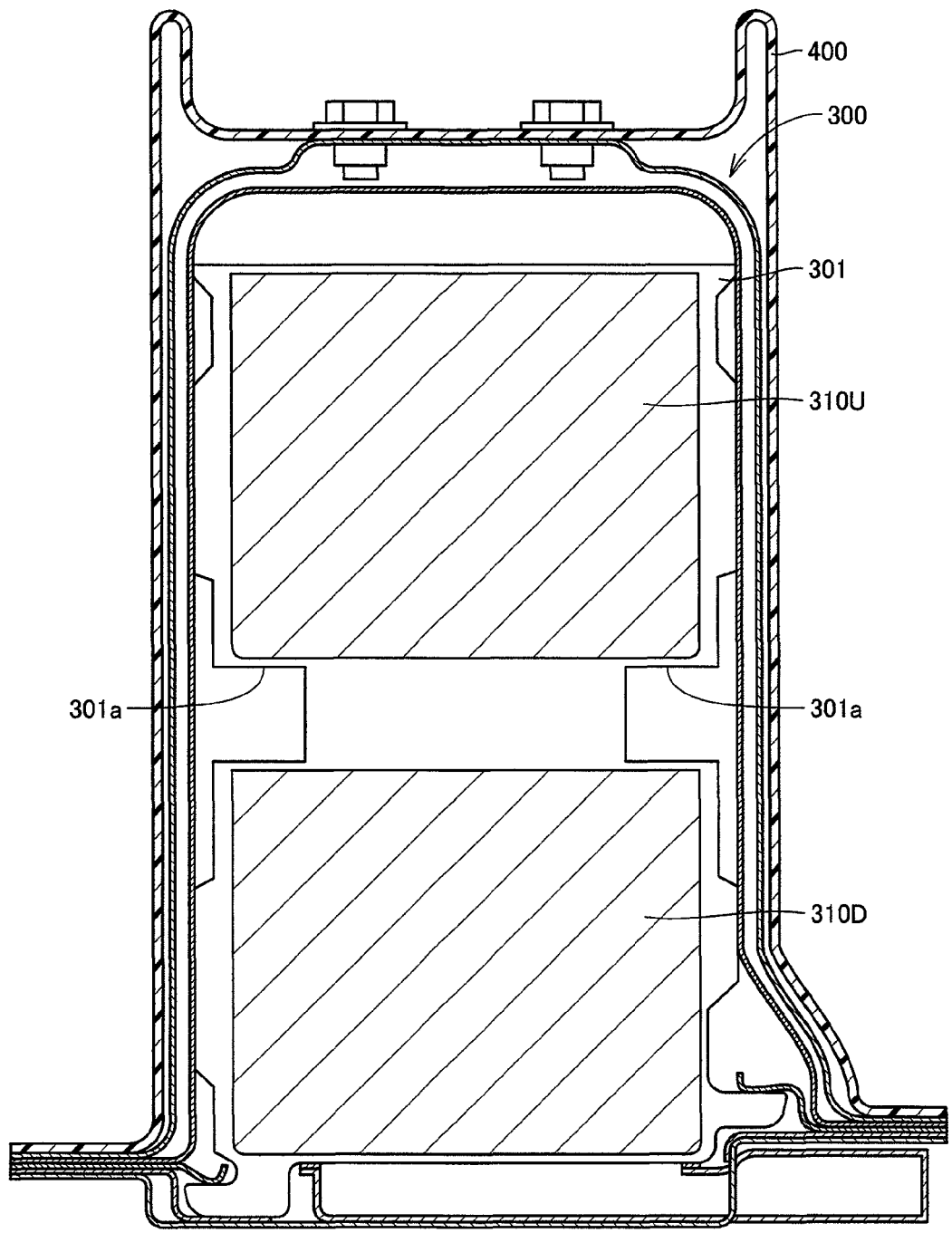
FIG. 6 is a sectional view of a power storage unit according to another embodiment of the present invention.

While power storage unit 100 as described above is shown as having battery module 110 arranged in a single stack, the idea of the present invention is also applicable to a structure in which battery modules 310U and 310D are arranged in two stacks one on the other as shown in FIG. 6.

FIG. 6 is a vertical sectional view showing a state in which a power storage unit 300 arranged in two stacks one on the other is housed in a console box 400 disposed between the driver's seat and front passenger's seat of a vehicle. A common reinforcing frame 301 extending vertically is provided for battery modules 310U and 310D arranged in two stacks one on the other. Recessed regions 301a for routing voltage detection wires for thermistors and the like are provided in regions located between the upper battery module 310U and the lower battery module 310D. Each of battery modules 310U and 310D may be formed of cells sandwiching a battery pack from both sides, or may be formed of a cell having therein a battery pack sealed with resin.

In this manner, the two-stack arrangement of battery modules 310U and 310D can also prevent damage to the battery cells that may be caused by the movement of the frame members provided in the seats in the event of a side crash of the vehicle, similarly to the aforementioned respective reinforcing members.

In the above-described embodiment, the battery packs are not limited to a rectangular shape. The idea of the present invention is also applicable to the battery packs of can or cylinder type. Further, a similar structure can also be employed when fuel cells are used as power storages instead of secondary batteries or capacitors.

Therefore, it should be understood that the embodiments disclosed herein are illustrative and non-restrictive in every respect. The technical scope of the present invention is defined by the claims, and is intended to include any modification within the meaning and scope equivalent to the terms of the claims.

The invention claimed is:

1. A power storage unit disposed between seats adjacent to each other in a transverse direction (direction X) of a moving conveyance, comprising:
   a battery case; and
   a battery module housed in said battery case,
   said battery module including reinforcing members having a strength higher than a strength of a component of said battery module,
   said reinforcing members being arranged at a predetermined spacing in a direction (direction Y) crossing the transverse direction,
   wherein said battery module has a plurality of battery cells held in a stacked state in the direction (direction Y) crossing the transverse direction,
   wherein said reinforcing members are held in a stacked state in said battery module between battery cells from among said plurality of battery cells, and
   wherein said reinforcing members have a dimension in the transverse direction larger than a contour of said battery cells.

2. The power storage unit according to claim 1, wherein said seats each have a frame member extending in the transverse direction and having an end plate on each side, and
   said reinforcing members are arranged at a spacing (P1) smaller than a length (P11) of said end plate in the direction (direction Y) crossing the transverse direction.

3. The power storage unit according to claim 1, wherein said reinforcing members are made of resin including a glass reinforced fiber.

4. The power storage unit according to claim 1, wherein the strength of said reinforcing members is configured to minimize damage to the power storage unit due to movement of the seats during a crash.

5. The power storage unit according to claim 1, wherein said reinforcing members are configured to absorb external crash forces applied to the power storage unit due to movement of the seats.

6. A power storage unit disposed between seats adjacent to each other in a transverse direction (direction X) of a moving conveyance, comprising:
   a battery case; and
   a battery module housed in said battery case,
   said battery module including reinforcing members having a strength higher than a strength of a component of said battery module,
   said reinforcing members being arranged at a predetermined spacing in a direction (direction Y) crossing the transverse direction,
   said reinforcing members having external contour dimensions in both the transverse direction (direction X) and a height direction (direction Z) that are greater than external contour dimensions of the battery cells in both the transverse direction (direction X) and the height direction (direction Z), respectively, and
   wherein the height direction (direction Z) is orthogonal to both the transverse direction (direction X) and the direction (direction Y) crossing the transverse direction.

\* \* \* \* \*